(No Model.)
A. M. BURRITT.
MACHINE FOR TAPPING STEAM, GAS, OR WATER FITTINGS.
No. 381,053. Patented Apr. 10, 1888.
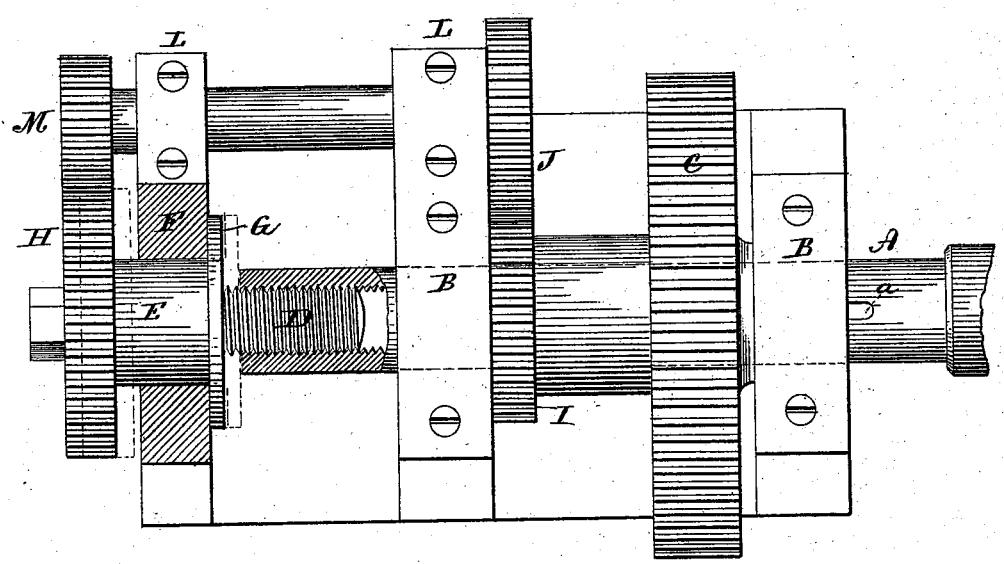

UNITED STATES PATENT OFFICE.

ALBERT M. BURRITT, OF WATERBURY, CONNECTICUT.

MACHINE FOR TAPPING STEAM, GAS, OR WATER FITTINGS.

SPECIFICATION forming part of Letters Patent No. 381,053, dated April 10, 1888.

Application filed October 24, 1887. Serial No. 253,196. (No model.)

*To all whom it may concern:*

Be it known that I, ALBERT M. BURRITT, of Waterbury, in the county of New Haven and State of Connecticut, have invented a new Improvement in Machines for Tapping Steam, Gas, and Water Fittings; and I do hereby declare the following, when taken in connection with accompanying drawing and the letters of reference marked thereon, to be a full, clear, and exact description of the same, and which said drawing constitutes part of this specification and represents in the figure a top or plan view in partial section of so much of a tapping-machine as is necessary to illustrate the invention.

This invention relates to an improvement in machines for tapping articles known in the trade as "steam, gas, and water fittings." In these articles the pitch of the screw-threads varies, according to the size of the article. It is therefore desirable that a single machine shall be adapted to tap the various sizes of articles. Consequently it is necessary that the same machine shall be adapted to give a feed corresponding to the various screw-threads. This feed is now generally produced by means of a leading-screw under some arrangement which imparts to the tap an advance movement corresponding to the thread it is to cut. The leading-screw, being of one pitch, is adapted to the varying pitches for the feed of the tap by differential gearing between the spindle which carries the tap and the leading-screw, so that by change of gearing between the spindle and leading-screw the feed of the leading-screw is made to correspond to the pitch of the thread of varying taps. If the leading-screw be made directly on the spindle or unyieldingly attached to it, with the nut also rigid, a difficulty arises in reversing the spindle to withdraw the tap, owing to "backlash" between the gears. If there be no yielding between the leading screw and the spindle, directly or indirectly, the action of the feed and the tap must be simultaneous. Otherwise the thread which has been cut by the tap would be "stripped." It is impossible to make the simultaneous reversing of the leading-screw and the tap, because of the backlash of the intermediate gears.

Various devices have been introduced between the leading-screw and the tap or tap-spindle to overcome this difficulty.

The object of my invention is to accomplish this result in a simple and effective manner.

In illustrating the invention I show only so much of the machine as includes the spindle, the leading screw feed, and the intermediate gearing.

A represents the tap-spindle, which is arranged to revolve freely in suitable bearings, B B, but so as to be free therein for longitudinal movement.

C represents the driving-gear, or, may be, a pulley, to which a band is applied. This gear is arranged upon the spindle A between the bearings B B, but so as to allow the spindle to move freely through it, yet so that the spindle shall partake of the revolution of the gear. This connection between the driving-gear and the spindle is produced in the well-known manner by means of a longitudinal groove, a, in the spindle and a corresponding key in the hub of the driving-gear.

At the rear end the spindle A is made tubular, and is internally screw-threaded, and into this internally screw-threaded end of the spindle the leading-screw D is arranged, it being correspondingly threaded. The leading-screw is attached to or made as a part of a hub, E, which is arranged in a bearing, F, concentric with the spindle. This hub is of a length greater than the length of the bearing F, so that the hub may slide through the bearing longitudinally to a certain extent. Upon the inner end of the hub, or the end toward the spindle, the hub is provided with a collar, G, which may bear against the inner face of the bearing F. Upon the outer end of the hub E a spur-gear, H, is made fast, and which practically forms a collar upon that end of the hub, which may be brought against the opposite side of the bearing, so that the extent of longitudinal movement permitted to the hub E may be limited, and so that the hub and the leading-screw will revolve with the gear H. Revolution is communicated to the gear H from a gear, I, on the spindle, which works into a corresponding gear, J, on a counter-shaft, K, arranged in bearings L L, and which at its extreme end carries a pinion, M, which works into the gear H.

The gear H and pinion M may be changed and other gears substituted therefor, or intermediate gears introduced, in the well-known method of applying gears to change the feed of a leading-screw, such, for illustration, as commonly used in screw-cutting lathes. This interchange of gears is too well known to require illustration or description.

Supposing the gears I and J to be alike, so that the same revolution of the pinion is imparted to the counter shaft K, the differential movement required for the leading-screw is produced by the difference in diameter between the pinion M and the gear H. As the spindle revolves it imparts revolution to the leading-screw, and were the revolution of the leading-screw of the same velocity as that of the spindle, then, of course, no longitudinal movement would be imparted to the spindle; but if the revolution of the leading-screw with a right-hand thread be slower than that of the spindle, then the spindle will tend to run from the leading-screw to the extent of the difference in their velocities, and this difference must correspond to the pitch of the thread required. Upon reversing the revolution of the spindle to withdraw the tap from the fitting the return of the spindle instantly commences; but because of the unavoidable backlash of the gearing between the spindle and the leading-screw the leading-screw cannot commence its return revolution at the same time of the spindle. If, then, there were no provision for longitudinal movement of the leading-screw, the result would be that the spindle would not start rearward instantly upon its reverse movement and the thread which had been cut in the fitting would unavoidably be stripped; but by allowing a certain amount of free longitudinal movement of the leading-screw this difficulty is avoided.

The required longitudinal movement of the leading-screw is permitted by the hub E, it being longer than its bearing, and so that as the spindle commences its revolution under the reverse direction the leading-screw rests until the backlash is taken up, and during this rest the action of the spindle upon the leading-screw is to draw it forward or into the spindle, as indicated in broken lines, Fig. 1, the hub sliding in its bearing for this purpose and until the backlash is taken up. Then the leading-screw revolves, and the movement of the leading-screw corresponds to the movement of the spindle.

It will be understood that the width of the face of the gears H and M in the first illustration is so much greater than the longitudinal movement permitted the hub that they do not under such longitudinal movement loose their engagement one with the other.

From the description of previous machines which I have made in the preamble to the specification it will be understood that I am aware of United States Letters Patent No. 280,575. In that invention the mandrel is provided with a screw-threaded sleeve which works through a revolving nut, longitudinal play being permitted between the said sleeve and mandrel, and whereby under the revolution of the said nut at a velocity varying from that of the revolution of the mandrel an advance is imparted to the said mandrel, whereas in this present invention the screw is made substantially as an integral part of a revolving collar supported in a bearing and having a limited amount of longitudinal movement, the rear end of the mandrel, made tubular and internally screw-threaded, corresponding to the said screw on the collar, and whereby the required feed for the mandrel is produced; and by this invention the screw-threaded sleeve of the said patent is avoided. I therefore do not wish to be understood as claiming anything shown or described in said Patent No. 280,575, except as in the combination hereinafter specified.

I claim—

1. In a tapping-machine substantially such as described, the combination of the revolving spindle, which carries the tap, a leading-screw arranged to revolve concentric with said spindle, and adapted to engage the said spindle longitudinally, a gear on said spindle and revolving therewith, a second gear on said screw, through which said screw receives its revolving movement, and gears intermediate between the said gear on the screw and the said gear on the spindle, whereby the revolution of the spindle may impart differential revolution to said screw, a hub in connection with said screw arranged in a bearing of less length than the length of the hub, the said hub provided with a collar on its opposite ends to limit the extent of such longitudinal movement, substantially as described.

2. The combination of the revolving tap-spindle A, made tubular at its rear end and internally screw-threaded, the leading-screw D, concentric with said spindle and screw-threaded corresponding to the interior of the rear end of the spindle, so as to work therein, the said spindle attached to or made a part of the hub E, the said hub E arranged in a bearing concentric with the spindle, but free for a limited amount of longitudinal movement, a gear, I, on said spindle and revolving therewith, a second gear, H, on said screw, through which said screw receives its revolving movement, and gears intermediate between the said gear on the spindle and the said gear on the screw, whereby revolution may be communicated to said leading-screw from said spindle, substantially as described.

ALBERT M. BURRITT.

Witnesses:
F. B. FIELD,
J. C. WHEELER.